United States Patent Office 3,795,667
Patented Mar. 5, 1974

3,795,667
NOVEL PEPTIDE INTERMEDIATES IN THE
PREPARATION OF SECRETIN
Miguel A. Ondetti, North Brunswick, N.J., assignor to
E. R. Squibb & Sons, Inc., New York, N.Y.
No Drawing. Continuation-in-part of abandoned application Ser. No. 658,327, Aug. 4, 1967. This application Sept. 30, 1970, Ser. No. 77,005
Int. Cl. C07c 103/52; C07g 7/00
U.S. Cl. 260—112.5                                    11 Claims

ABSTRACT OF THE DISCLOSURE

This invention relates to novel intermediates to be employed in the preparation of the gastrointestinal hormone, secretin. More particularly, this invention relates to compounds of the formula X-L-histidyl-L-seryl-L-aspartylglycyl hydrazide wherein X is an N-terminal amino protecting group, to intermediates in the preparation of these compounds, and to salts of such intermediates.

Related application

This application is a continuation-in-part of copending application Ser. No. 658,327, filed Aug. 4, 1967, now abandoned.

This invention relates to novel intermediates to be employed in the preparation of the gastrointestinal hormone, secretin. More particularly, this invention relates to compounds of the formula X-L-histidyl-L-seryl-L-aspartylglycyl hydrazide wherein X is an N-terminal amino protecting group, to intermediates in the preparation of these compounds, and to salts of such intermediates.

In application Serial No. 553,290 of Bodanszky et al., filed May 27, 1966, now U.S. Pat. 3,400,118, a process is disclosed for the preparation of secretin which entails the formation of four partial peptide sequences and the subsequent joining of these sequences to form the single peptide chain which is secretin.

This invention thus relates to an improvement in the synthesis described in that application. It is therefore an object of this invention to provide novel and more advantageous intermediates in that synthesis. More particularly, it is an object of this invention to provide novel partial sequences corresponding to the first four amino acid residues in the secretin molecule, that is L-histidyl (His), L-seryl (Ser), L-aspartyl (Asp), and glycol (Gly).

The novel intermediates of this invention are prepared synthetically beginning with a protected hydrazide, such as, for example, benzyloxycarbonyl hydrazine, and adding the amino acids, one at a time, until a peptide hydrazide is prepared containing the desired amino acid chain. Such addition is accomplished by converting the amino acid to be added to a protected form, such as, for example, its t-butyloxycarbonyl derivative, further converting the protected amino acid to an active form, such as, for example, its nitrophenyl ester derivative, and then interacting the thus protected, activated amino acid with the protected hydrazine or a previously prepared peptide in the chain, in the latter case, after removing the amino acid protecting group originally present in the previously prepared peptide.

Thus, in accordance with this synthesis, intermediates of the following types are contemplated:

(1) Compounds of the formula

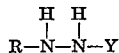

wherein R is Gly, X-Gly, L-Asp-Gly, X-L-Asp-Gly, β-protected-L-Asp-Gly, X-β-protected-L-Asp-Gly, O-protected-L-Ser-L-Asp-Gly, X-O-protected-L-Ser-L-Asp-Gly, O-protected-L-Ser-β-protected-L-Asp-Gly, X-O-protected-L-Ser-β-protected-L-Asp-Gly, L-His-O-protected-L-Ser-β-protected-L-Asp-Gly, or X-L-His-O-protected-L-Ser-L-Asp-Gly, and wherein X and Y are different amino protecting groups except that when either X or Y is t-butyloxycarbonyl, the other is not o-nitrophenyl-sulfenyl, and salts thereof; and (2) Compounds of the formula X-L-His-L-Ser-L-Asp-Gly-NH-NH₂ wherein X is an N-teminal amino protecting group.

The above-mentioned salts include pharmaceutically acceptable acid addition salts, for instance, hydrochlorides, hydrobromides, acetates, fluoroacetates, such as trifluoroacetate, and chloroacetates, such as dichloroacetate.

Among the suitable activating groups to be employed in the above process may be mentioned any group which causes the acid function to become more reactive, such as mixed anhydrides (which normally involves the acylation of an amine with the mixed anhydrides of, for instance, an acyl amino acid and isovaleric acid), azides, acid chlorides, reaction products with carbodiimides, reactive N-acyl compounds, O-acyl hydroxylamine derivatives, and active esters, such as alkyl esters with electron attracting (negative) substituents, vinyl esters, enol esters, phenyl esters, halophenyl esters, thiophenyl esters, nitrophenyl esters, 2,4-dinitrophenyl esters, and nitrophenyl-thiol esters.

In forming the peptide sequences in the above manner, the N-terminal amino group of the compounds of the preesnt invention may be protected in accordance with the skill of the art. The particular N-terminal amino protecting group selected is not critical. The choice of which N-terminal amino protecting group to employ in a specific case will depend on various factors, e.g., the nature of the next amino acid or peptide which is to be attached to the N-terminal group of the growing peptide chain, the ease of removal of the protecting, reaction solvents, temperature, etc. Some commonly used amino protecting groups are the following:

(1) amine hydrochlorides
(2) the p-toluenesulfonyl group
(3) the benzyloxycarbonyl (carbobenzoxy) group
(4) substituted benzyloxycarbonyl and other urethane protecting groups
(5) the trifluoroacetyl group
(6) the phthalyl (or phthaloyl) group
(7) the diphenylmethyl (benzhydryl) and triphenylmethyl (trityl) groups
(8) the formyl group
(9) lactams
(10) Schiff bases and enamines
(11) the benzylsulfonyl group
(12) the tritylsulfenyl and aryl sulfenyl groups.

Some specific protecting groups are, for example, t-butyloxycarbonyl, o-nitrophenylsulfenyl, benzyloxycarbonyl, trifluoroacetyl or tosyl. A more complete discussion and listing of N-terminal amino-protecting groups may be obtained by reference to standard works on peptide synthesis, e.g. Bodanszky et al., "Peptide Synthesis," chapter 4, Interscience publishers, 1966, or Schroder et al., "The Peptides," vol. I, pp. xxiii–xxix, Academic Press, 1965.

Similarly, in forming peptide sequences according to the present invention, the hydroxyl group of serine may be protected in accordance with the skill of the art. The particular hydroxyl protecting group selected is not critical. The choice of which hydroxy protecting group to employ in a specific case will be made by those skilled in the art in accordance with the particular circumstances. Some commonly used hydroxyl protecting groups are the following:

(1) O-acyl and S-acyl derivatives
(2) O-alkyl and S-alkyl derivatives
(3) the trimethylsilyl group
(4) the t-butyl group.

Some specific hydroxyl protecting groups are, for example, benzyl, t-butyl and tetrahydropyanyl. A more complete discussion and listing of hydroxyl protecting groups may be obtained by reference to standard works on peptide synthesis, e.g. Bodanszky et al., supra, and Schroder et al., supra.

Similarly, in forming peptide sequences according to the present invention, the β-carboxyl group of aspartic acid may be protected in accordance with the skill of the art. The particular carboxyl protecting group selected is not critical. The choice of which carboxyl protecting group to employ in a specific case will be made by those skilled in the art in accordance with the particular circumstances. Some commonly used carboxyl protecting groups are the following:

(1) salt formation
(2) lower alkyl esters
(3) phenyl substituted lower alkyl esters, e.g., benzyl and benzhydryl esters
(4) p-nitrobenzyl esters
(5) p-methoxybenzyl esters
(6) phthalimidomethyl esters
(7) t-butyl esters
(8) cyclopentyl esters
(9) methylthioethyl esters
(10) trimethylsilyl group
(11) hydrazides.

Some specific carboxyl protecting groups are methyl, ethyl, propyl, t-butyl, and benzyl. A more complete discussion of carboxyl protecting groups may be obtained by reference to standard works on peptide synthesis, e.g., Bodanszky et al., supra, and Schroder et al., supra.

It should be noted at this point that since protecting group X in the foregoing formulae must be selectively removed in order to add the next amino acid in the sequence, it is required that X and Y be different.

Various methods of removing protecting groups X and Y from the peptide chain are known in the art. However, since selective removal of X is required, the method chosen will depend upon the protecting group employed. For instance, where X represents t-butyloxycarbonyl, it may be removed by acid treatment, as by trifluoroacetic acid or the like. Where X represents benzyloxycarbonyl, the removal may be by hydrogenolysis for instance, in the presence of a palladium on charcoal catalyst. In those instances where X represents trifluoroacetyl, it may be removed by treatment with a nucleophile (e.g., hydrazine in methanol, sodium hydroxide in methanol or an alkoxide such as sodium methoxide or sodium ethoxide, and the like). If X is o-nitrophenylsulfenyl, it may be removed either by treatment with mild acid [e.g., a hydrohalo acid (such as hydrobromic or hydrochloric acids) in a solvent such as ethyl acetate, ether, or other alkyl ester or alkyl ether solvents], or with a sulfur nucleophile, such as sodium thiophenoxide, nitrothiophenoxide, and the like. By proceeeding in this manner, selective removal of the X protecting group is achieved. Selective removal of Y to form the protected peptide hydrazide secretin intermediate, which is a final product of this invention, may be accomplished in the same manner as set forth above, the appropriate method of removal being selected, dependent upon the protecting group employed.

The hydroxyl protecting groups may be removed by known reactions, such as hydrogenolysis, treatment with acids such as hydrochloric acid, hydrobromic acid, trifluoroacetic acid, and the like.

The carboxyl protecting groups may be removed by known reactions, such as, for example, alkaline hydrolysis or hydrogenolysis.

It has surprisingly been found that by employing the hydrazide intermediate of this invention in the synthesis of secretin as opposed to a protected peptide ester as heretofore contemplated, an unobvious increase in yield is obtained, coupled with a reaction mixture, uncomplicated to a much greater extent by by-products, and accordingly, much easier to purify than reaction mixtures previously obtainable.

The invention will be further illustrated in the following examples. All temperatures are in degrees centigrade unless otherwise stated.

EXAMPLE 1

N-glycyl-N'-benzyloxycarbonyl hydrazine, trifluoroacetate

N-tert.-butyloxycarbonylglycine (5.25 g., 30 mmoles) and benzyloxycarbonyl hydrazine (4.98 g., 30 mmoles) are dissolved in 75 ml. of methylene chloride and stirred in an ice bath. Dicyclohexylcarbodiimide (6.18 g., 30 mmoles) is added. The reaction proceeded for one hour at 0° C. followed by five hours at room temperature. The precipitate of dicyclohexylurea is filtered off and washed with methylene chloride. The filtrate is concentrated to dryness in vacuo. The residue is triturated with ether and hexane. The crystalline trifluoroacetate is filtered, washed with ether and dried in vacuo over potassium hydroxide. Yield, 9.35 g. (92%); M.P. (172) 175–176° C.

Analysis.—Calc'd for $C_{12}H_{14}O_5N_3F_3$ (percent): C, 42.73; H, 4.18; N, 12.46. Found (percent): C, 43.66; H, 4.71; N, 12.17.

EXAMPLE 2

N-tert.-butyloxycarbonyl-α-p-nitrophenyl-β-tert.-butyl-L-aspartate

N-tert.-butyloxycarbonyl - β - tert.-butyl - L - aspartic acid (3.46 g., 12 mmoles) and p-nitrophenol (1.8 g., 13 mmoles) are dissolved in 18 ml. of ethyl acetate and stirred in an ice bath. Dicyclohexylcarbodiimide (2.47 g., 12 mmoles) is added. The reaction proceeded for one hour at 0° C. followed by 16 hours at room temperature. The precipitate of dicyclohexylurea is filtered off and washed with ethyl acetate. The filtrate is concentrated to dryness in vacuo and the residue is crystallized from ether and hexane to yield 4.0 g. (81%) of a product, M.P. (73) 76–78°. $[\alpha]_D^{24}$ —41° ($C_2$ DMF 1% HOAc).

Analysis.—Calc'd for $C_{19}H_{26}O_8N_2$ (percent): C, 55.60; H, 6.39; N, 6.83. Found (percent): C, 55.31; N, 6.70; N, 6.86.

EXAMPLE 3

N-(tert.-butyloxycarbonyl-β-tert. - butyl - L - aspartyl-glycyl-N'-benzyloxycarbonyl hydrazine, and N - (L-aspartylglycyl) - N' - benzyloxycarbonyl hydrazine trifluoroacetate (a) N - (glycyl)-N'-benzyloxycarbonyl hydrazine, trifluoroacetate (3.70 g., 11 mmoles) is dissolved in 18 ml. of N,N'-dimethylformamide and placed in an ice bath with stirring. Triethylamine (1.54 ml., 11 mmoles) is added followed by N - tert.-butyloxycarbonyl-α-p-nitrophenyl-β-tert.-butyl - L - aspartate (3.69 g., 9 mmoles). After four hours at room temperature, the reaction mixture is diluted with ethyl acetate and extracted once with 20% citric acid followed by four water extractions. The ethyl acetate is dried over $MgSO_4$ and taken to dryness in vacuo. The residue is lyophilized from benzene yielding a powder (5.4 g.).

Analysis.—Calc'd for $C_{23}H_{34}O_8N_4$ (percent): C, 55.86; H, 6.90; N, 11.33. Found (percent): C, 55.28; H, 7.24; N, 11.30.

(b) The protected dipeptide is dissolved in 25 ml. of trifluoroacetic acid. After one hour, the acid is removed in vacuo and the residue triturated with ether. This yields a preciptate of 4 g.

EXAMPLE 4

N-(tert.-butyloxycarbonyl-O-benzyl-L-seryl - L - aspartylglycyl)-N'-benzyloxycarbonyl hydrazine, and N - (O-benzyl-L-seryl-L-aspartylglycyl) - N' - benzyloxycarbonyl hydrazine trifluoroacetate (a) N-(L-aspartylglycyl) - N' - benzyloxycarbonyl hydrazine, trifluoroacetate (7.1 g., 15.7 mmoles) is dissolved in 70 ml. of N,N'-dimethylformamide, chilled in an ice bath and triethylamine (4.62 ml., 33 mmoles) added. The resulting solution is mixed with another of N-tert.-butyloxycarbonyl-O-benzyl - L - serine p - nitrophenylester (7.94 g., 24 mmoles) in N,N'-dimethylformamide (10 ml.). After one and one-half hours, the reaction mixture is diluted with 400 ml. of ethyl acetate and extracted once with 20% citric acid and three times with water. The ethyl acetate is dried over $MgSO_4$ and taken to dryness in vacuo. The residue is crystallized from a minimum of ethyl acetate, 7.6 g., (79%); M.P. 83–84°.

Analysis.—Calc'd for $C_{29}H_{37}O_{10}N_5$ (percent): C, 56.60; H, 6.06; N, 11.4. Found (percent): C, 56.41; H, 6.07; N, 11.06.

(b) The trifluoroacetate is prepared, following the procedure of Example 3(b).

EXAMPLE 5

N-(tert.-butyloxycarbonyl-L-histidyl-O-benzyl - L - seryl-L-aspartylglycyl)-N'-benzyloxycarbonyl hydrazine N-tert.-butyloxycarbonyl-L-histidyl hydrazide (3.22 g., 12 mmoles) is dissolved in 48 ml. of ethyl acetate and added with 1 N HCl (36 ml.) while stirring in an ice-salt bath. After five minutes, sodium nitrite (849 mg.) is added followed, after three minutes, by a 50% solution of potassium carbonate (9.6 ml.). After three minutes, the stirring is stopped and the aqueous phase is transferred to 12 ml. of cold ethyl actate and vigorously stirred. The ethyl acetate extracts are pooled, dried over $MgSO_4$ and added to a solution of N-(O-benzyl-L-seryl-L-aspartylglycyl) - N' - benzyloxycarbonyl hydrazine trifluoroacetate (5.04 g., 8 mmoles) in a mixture of N,N'-dimethylformamide (24 ml.) and triethylamine (2.24 ml., 16 mmoles). After 24 hours, another portion of tert.-butyloxycarbonyl-L-histidine azide (from 1.075 g. of the hydrazide) is added. After 48 hours, acetic acid (1 ml.) is added and the reaction mixture is concentrated to dryness in vacuo at room temperature. The residue is crystallized from 100 ml. of 50% ethanol. Yield is 4.86 g., M.P. (166) 172–173° C. Recrystallization from the same solvent yields 4.39 g., (73%); M.P. (172) 174–176° C. $[\alpha]_D^{24}$ —12.1° (c. 1.1–N,N'-dimethylformamide).

Analysis.—Calc'd for $C_{35}H_{44}O_{11}N_8 \cdot 2H_2O$ (percent): C, 53.28; H, 6.13; N, 14.20. Found (percent): C, 53.45; H, 5.94; N, 14.53.

EXAMPLE 6

Tert.-butyloxycarbonyl-L-histidyl-L-seryl-L-aspartylglycine hydrazide

N-(tert.-butyloxycarbonyl-L-histidyl - O - benzyl - L-seryl-L-aspartylglycyl)-N' - benzyloxycarbonyl hydrazine (900 mg., 1.2 mmoles) is dissolved in 90 ml. of a mixture of methanol, water, acetic acid (2:1:1) and 10% palladium on carbon (300 mg.) added. After five hours stirring under a hydrogen atmosphere, the reaction mixture is filtered and the filtrate concentrated to dryness in vacuo. The residue is triturated with ethyl acetate until it becomes solid. Yield, 652 mg. (63%).

Analysis.—Calc'd for $C_{20}H_{32}O_9N_8$—1½$H_2O$ (percent): C, 43.24; H, 6.35; N, 20.16 ($RCONHNH_2$: 5.3). Found (percent): C, 43.71; H, 6.32; N, 19.58 ($RCONHNH_2$: 5.3).

EXAMPLE 7

N-tert.-butyloxycarbonyl-L-histidyl-L-seryl - L - aspartylglycyl-L-threonyl-L-phenylalanyl-L-threonyl - L - seryl-L-glutamyl-L-leucyl-L-seryl-L-arginyl - L - leucyl - L-arginyl-L-aspartyl-L-seryl - L - alanyl - L - arginyl - L-leucyl-L-glutaminyl-L-arginyl-L-leucyl - L - leucyl-L-glutaminylglycyl-L-leucyl-L-valine amide N-tert.-butyloxycarbonyl - L - histidyl - L - seryl - L-aspartylglycine hydrazide (96 mg., 0.18 mmoles) is dissolved in 1.5 ml. of N,N'-dimethylformamide with stirring and cooled to —20° C. in an acetone-Dry Ice bath. To this 0.09 ml. of concentrated HCl are added and the temperature maintained at —15° C. for five minutes. A 14% aqueous solution of sodium nitrite (0.15 ml.) is added and the temperature maintained at —15° C. for five minutes. The reaction mixture is cooled to —25° C. and N-ethylpiperidine (0.126 ml.) added. To this tetrapeptide azide solution the free tricosapeptide (prepared as in U.S. application Ser. No. 553,290, now U.S. Pat. 3,400,148) Thr - Phe-Thr-Ser-Glu-Leu-Ser-Arg-Leu-Arg- Asp-Ser-Ala-Arg-Leu-Glu($NH_2$)-Arg-Leu-Leu- Glu($NH_2$)-Gly-Leu-Val-$NH_2$ pentaacetate (168 mg., 0.6 mmoles) dissolved in 2.1 ml. N,N'-dimethylformamide is added. After 24 hours, another portion of tetrapeptide azide (from 32 mg. of hydrazide) is added. After 24 hours, the reaction mixture is taken to dryness in vacuo at room temperature.

EXAMPLE 8

L-histidyl-L-seryl-L-aspartylglycyl-L-threonyl - L - phenylalanyl-L-threonyl-L-seryl-L-glutamyl - L - leucyl-L-seryl-L-arginyl-L-leucyl-L-arginyl-L-aspartyl - L - seryl-L-alanyl-L-arginyl-L-leucyl-L-glutaminyl - L - arginyl-L-leucyl-L-leucyl-L-glutaminylglycyl - L - leucyl - L-valine amide The partially protected heptacosapeptide amide is dissolved in 6 ml. of cold trifluoroacetic acid. After 15 minutes at room temperature, ether is added to maximum precipitation. Yield is 330 mg. Purification of this material can be achieved by countercurrent distribution in the N-butanol-0.1 M phosphate buffer pH 7 (1:1). This product has all the biological properties of porcine secretin.

EXAMPLE 9

N-(tert.-butyloxycarbonyl-β-benzyl-L-aspartylglycyl)-N'-benzyloxycarbonyl hydrazine N-(glycyl)-N'-benzyloxycarbonyl hydrazine trifluoroacetate (3.70 g., 11 mmoles) is dissolved in 18 ml. of N,N'-dimethylformamide and placed in an ice bath with stirring. Triethylamine (1.54 ml., 11 mmoles) is added followed by N-tert.-butyloxycarbonyl-α-γ-nitrophenyl - β-benzyl aspartate (4 g., 9 mmoles). After four hours at room temperature, the mixture is diluted with ethyl acetate and extracted with 20% citric acid, water, bicarbonate, water. After drying over $MgSO_4$, the ethyl acetate is removed in vacuo. The residue is triturated with ether to yield the final product.

EXAMPLE 10

N-(β-benzyl-L-aspartylglycyl)-N'-benzyloxycarbonyl hydrazine trifluoroacetate

The protected dipeptide of the preceding example (5 g.) is dissolved in 25 ml. of trifluoroacetic acid. After 15 minutes the acid is removed in vacuo and the residue triturated with ether, filtered, and washed thoroughly with ether to yield the title compound.

EXAMPLE 11

N - (tert. - butyloxycarbonyl - O - benzyl - L - seryl - β-benzyl - L - aspartylglycyl) - N' - benzyloxycarbonyl hydrazine N-(β-benzyl-L-aspartylglycyl) - N' - benzyloxycarbonyl hydrazine trifluoroacetate (7.3 g., 16 mmoles) is dissolved in 70 ml. of DMF, chilled in an ice bath and neutralized with triethylamine (2.3 ml.). The resulting solution is mixed with another of N-tert.-butyloxycarbonyl-O-benzyl-L-serine p-nitrophenylester (7.9 g., 24 mmoles) in DMF (10 ml.). After 1.5 hours the reaction mixture is diluted with 400 ml. of ethyl acetate and washed with 20% citric acid and water. After drying over MgSO₄ the ethyl acetate is removed in vacuo. The residue is crystallized from ethyl acetate.

EXAMPLE 12

N-(O-benzyl - L - seryl - β - benzyl - L - aspartylglycyl)-N'-benzyloxycarbonyl hydrazine trifluoroacetate This compound is prepared using the procedure described in Example 10 using as starting material the protected tripeptide of Example 11.

EXAMPLE 13

N - (tert. - butyloxycarbonyl - L - histidyl - O - benzyl-L - seryl - β - benzyl - L - aspartylglycyl) - N' - benzyloxycarbonyl hydrazine N-tert.-butyloxycarbonyl-L-histidine hydrazide (3.22 g., 12 mmoles) is dissolved in 48 ml. of ethyl acetate and the solution cooled in an ice-salt bath while stirring. After 5 minutes aqueous N HCl (36 ml.) is added and after another 3 minutes sodium nitrite (849 mg.) is added. After 3 minutes more a 50% solution of potassium carbonate (9.6 ml.), is added. Three minutes later the stirring is stopped and the aqueous phase separated and washed with fresh ethyl acetate. The combined ethyl acetate layers are dried over MgSO₄ and added to a solution of N-(O-benzyl-L-seryl-β-benzyl-L-aspartylglycyl)-N'-benzyloxycarbonyl hydrazine trifluoroacetate (5.2 g., 8 mmoles) in a mixture of DMF (24 ml.) and triethylamine (2.24 ml.). After 24 hours another portion of tert.-butyloxycarbonyl-L-histidine azide (from 1.1 g. of the hydrazide) is aded. After a total of 48 hours the solvent is removed in vacuo and the residue crystallized from ethanol-water.

EXAMPLE 14

N - (L - Histidyl - O - benzyl - L - seryl - β - benzyl - L-aspartylglycyl)N'-benzyloxycarbonyl hydrazine trifluoroacetate This compound is prepared following the procedure described in Example 10 using as starting material the protected tetrapeptide of Example 13.

EXAMPLE 15

Tert.-butyloxycarbonyl-L-histidyl-L-seryl-L-aspartylglycine hydrazide

The compound of Example 13 (1.2 mmoles) is dissolved in 90 ml. of a mixture of methanol, water and acetic acid (2:1:1), and 10% palladium on carbon (300 mg.) added. After stirring for five hours under a hydrogen atmosphere, the reaction mixture is filtered and the filtrate concentrated to dryness in vacuo. The title compound is obtained by triturating the residue with ethyl acetate until it becomes solid.

What is claimed is:
1. A compound of the formula

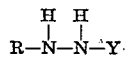

and pharmaceutically acceptable acid addition salts thereof wherein R is L-Asp-Gly, X-L-Asp-Gly, β-t-butyl-L-Asp-Gly, X-β-t-butyl-L-Asp-Gly, O-protected-L-Ser-L-Asp-Gly, X-O-protected-L-Ser-L-Asp-Gly, L-His-O-protected-L-Ser-β-protected-L-Asp-Gly, or X-L-His-O-protected-L-Ser-L-Asp-Gly wherein X and Y are different amino protecting group provided that when either X or Y is t-butyloxycarbonyl, the other is not o-nitrophenylsulfenyl.

2. A compound of claim 1 wherein R is O-protected L-Ser-L-Asp-Gly, or X-O-protected-L-Ser-L-Asp-Gly.

3. A compound of claim 1 wherein R is L-His-O-protected-L-Ser-β-protected-L-Asp-Gly, or X-L-His-O-protected-L-Ser-β-protected-L-Asp-Gly.

4. A compound of claim 1 wherein R is L-Asp-Gly, X-L-Asp-Gly, β-protected-L-Asp-Gly, or X-β-protected-L-Asp-Gly.

5. A compound of claim 2 having the name N-(t-butyloxycarbonyl-O-benzyl-L-Ser-L-Asp-Gly) - N' - benzyloxycarbonyl hydrazine.

6. A compound of claim 2 having the name N-(O-benzyl-L-Ser-L-Asp-Gly) - N' - benzyloxycarbonyl hydrazine trifluoroacetate.

7. A compound of claim 4 having the name N-(t-butyloxycarbonyl - β - t - butyl-L-Asp-Gly) - N - benzyloxycarbonyl hydrazine.

8. A compound of claim 3 having the name N-(t-butyloxycarbonyl-L-His-O-benzyl - L - Ser-L-Asp-Gly)-N'-benzyloxycarbonyl hydrazine.

9. A compound of claim 4 having the name N-(L-Asp-Gly)-N'-benzyloxycarbonyl hydrazine trifluoroacetate.

10. A compound of the formula X-L-His-L-Ser-L-Asp-Gly hydrazide where X is an N-terminal amino protecting group.

11. A compound of claim 10 wherein X is t-butyloxycarbonyl.

References Cited

UNITED STATES PATENTS

| | | | |
|---|---|---|---|
| 3,400,118 | 9/1968 | Bodanszky et al. | 260—112.5 |
| 3,341,510 | 9/1967 | Chillemi et al. | 260—112.5 |
| 3,340,274 | 9/1967 | Callahan et al. | 260—326.3 |
| 3,250,758 | 5/1966 | Weygand et al. | 260—112.5 |

OTHER REFERENCES

Ondetti et al., J. Amer. Chem. Soc. 90, 4711–4715 (1968).

Ondetti et al., Pharmacology of Hormonal Polypeptides and Proteins, Bach et al. eds., Plenum Press, New York (1968), pp. 18–31.

LeQuesne et al., J. Chem. Soc. 1952, 26.

Hoffman et al., J. Amer. Chem. Soc. 74, 470–472 (1952).

Schroder et al., The Peptides, vol I, Academic Press, New York (1965), pp. 64–67.

Bodanszky et al., Chem. Ind. (London) 1966, 1757–1758.

Bodanszky et al., Peptides, Boyerman et al. eds., North-Holland Publishing Comp, Amsterdam (1967), pp. 242–244.

Bodanszky et al., Peptide Synthesis, John Wiley and Sons, New York (1966), pp. 15–19.

Thompson, Biochem. J. 60, 507–515 (1955).

LEWIS GOTTS, Primary Examiner

R. J. SUYAT, Assistant Examiner